US012553980B2

(12) United States Patent
Watanabe

(10) Patent No.: US 12,553,980 B2
(45) Date of Patent: Feb. 17, 2026

(54) POSITIONING APPARATUS, POSITIONING METHOD, AND NON-TRANSITORY COMPUTER READABLE MEDIUM

(71) Applicant: Mitsubishi Electric Corporation, Tokyo (JP)

(72) Inventor: Futa Watanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 258 days.

(21) Appl. No.: 18/524,584

(22) Filed: Nov. 30, 2023

(65) Prior Publication Data

US 2024/0103114 A1 Mar. 28, 2024

Related U.S. Application Data

(63) Continuation of application No. PCT/JP2021/027097, filed on Jul. 20, 2021.

(51) Int. Cl.
  *G01S 5/02* (2010.01)
  *G01S 5/00* (2006.01)
  *G01S 5/04* (2006.01)

(52) U.S. Cl.
  CPC .............. *G01S 5/021* (2013.01); *G01S 5/04* (2013.01); *G01S 5/0063* (2013.01)

(58) Field of Classification Search
  CPC .......... G01S 5/0063; G01S 5/01; G01S 5/021; G01S 5/0268; G01S 5/04; G01S 5/06
  See application file for complete search history.

(56) References Cited

U.S. PATENT DOCUMENTS

| 10,338,193 B2 * | 7/2019 | Beko ......................... G01S 5/12 |
| 2005/0116858 A1 | 6/2005 | Odamura |

(Continued)

FOREIGN PATENT DOCUMENTS

| EP | 1 531 338 A2 | 5/2005 |
| EP | 2 415 310 A1 | 2/2012 |

(Continued)

OTHER PUBLICATIONS

International Search Report for PCT/JP2021/027097(PCT/ISA/210) mailed on Oct. 5, 2021.

(Continued)

*Primary Examiner* — Robert W Hodge
*Assistant Examiner* — Fred H Mull
(74) *Attorney, Agent, or Firm* — Birch, Stewart, Kolasch & Birch, LLP

(57) ABSTRACT

A positioning apparatus (100) includes a temporary position computation unit (120), a two-dimensional position computation unit (140), a three-dimensional position computation unit (150), and a position aggregation unit (160), and executes three-dimensional positioning of a terminal using a relative angle formed by each base station and the terminal. The temporary position computation unit (120) computes a temporary position of the terminal based on observation data. The two-dimensional position computation unit (140) computes a two-dimensional position of the terminal based on the observation data and the temporary position. The three-dimensional position computation unit (150) computes a three-dimensional position of the terminal based on the observation data and the temporary position. The position aggregation unit (160) determines the position of the terminal by aggregating the two-dimensional position and the three-dimensional position.

10 Claims, 17 Drawing Sheets

(56) References Cited

U.S. PATENT DOCUMENTS

| | | |
|---|---|---|
| 2010/0248637 A1 | 9/2010 | Sahinoglu et al. |
| 2015/0042516 A1 | 2/2015 | Cui et al. |
| 2019/0086504 A1 | 3/2019 | Cui et al. |
| 2021/0237761 A1* | 8/2021 | Das .................. G01S 13/89 |

FOREIGN PATENT DOCUMENTS

| | | |
|---|---|---|
| EP | 2 836 035 A1 | 2/2015 |
| JP | 4-370711 A | 12/1992 |
| JP | 2001-305210 A | 10/2001 |
| JP | 2005-147720 A | 6/2005 |
| JP | 2007-256041 A | 10/2007 |
| JP | 2008-139292 A | 6/2008 |
| JP | 2008-224489 A | 9/2008 |
| JP | 2008-298715 A | 12/2008 |
| JP | 2012-517583 A | 8/2012 |
| JP | 2012-202734 A | 10/2012 |
| JP | 2015-520550 A | 7/2015 |
| JP | 2018-197717 A | 12/2018 |
| JP | 2020-38112 A | 3/2020 |
| JP | 2020-153786 A | 9/2020 |
| JP | 2021-9043 A | 1/2021 |
| JP | 2021-47115 A | 3/2021 |
| WO | WO 2010/113829 A1 | 10/2010 |

OTHER PUBLICATIONS

Tomic et al.,"On Target Localization Using Combined RSS and AoA Measurements," Sensors, vol. 18, Issue.4, pp. 1-25,2018.

Watanabe et al., "Wireless Sensor Network Localization Using AoA Measurements with Two-Step Error Variance-Weighted Least Squares," IEEE Access, DOI:10.1109/Access.2021.3050309, vol. 9, Jan. 8, 2021, pp. 10820-10828.

* cited by examiner

POSITIONING APPARATUS, POSITIONING METHOD, AND NON-TRANSITORY COMPUTER READABLE MEDIUM

CROSS REFERENCE TO RELATED APPLICATION

This application is a Continuation of PCT International Application No. PCT/JP2021/027097, filed on Jul. 20, 2021, which is hereby expressly incorporated by reference into the present application.

TECHNICAL FIELD

The present disclosure relates to a positioning apparatus, a positioning method, and a positioning program.

BACKGROUND ART

There is a technique that performs three-dimensional positioning of a terminal that is present in a space where multiple base stations are installed and that performs wireless communication with each of the multiple base stations, on the basis of a relative angle formed by each one of the multiple base stations and the terminal.

CITATION LIST

Non-Patent Literature

Non-Patent Literature 1: Futa Watanabe, "Wireless Sensor Network Localization Using AoA. Measurements with Two-Step Error Variance-Weighted. Least Squares," IEEE ACCESS, DOI: 10.1109/ACCESS.2021.3050309

SUMMARY OF INVENTION

Technical Problem

Non-Patent Literature 1 discloses a technique to determine the position of a terminal based on information on the relative angle between the terminal and each base station. The technique disclosed by Non-Patent Literature 1 has a challenge that an error is large when the shape of an area where the terminal is present is not a perfect cube.

An object of the present disclosure is to reduce an error when the shape of the area where a terminal is present is not a perfect cube in three-dimensional positioning of the terminal that uses the relative angle formed by each base station and the terminal.

Solution to Problem

A positioning apparatus according to the present disclosure includes:
 a temporary position computation unit to, using a plurality of two-dimensional direction vectors and a plurality of three-dimensional direction vectors, determine a temporary position of a terminal communicating with each of a plurality of base stations in a three-dimensional space, wherein the plurality of two-dimensional direction vectors are vectors that are each computed using each of a plurality of observed angles which has been observed as an angle formed by a position of each of the plurality of base stations and the terminal, said vectors being based on an angle for a two-dimensional direction of the plurality of observed angles, and the plurality of three-dimensional direction vectors are vectors that are each computed using each of the plurality of observed angles and are based on an angle for a three-dimensional direction of the plurality of observed angles;
 a two-dimensional position computation unit to determine a two-dimensional position of the terminal using a two-dimensional component of the position of each of the plurality of base stations, the plurality of two-dimensional direction vectors, and a plurality of two-dimensional weights, wherein the plurality of two-dimensional weights are each a weight corresponding to the two-dimensional component of the position of each of the plurality of base stations and determined based on the two-dimensional component of the position of each of the plurality of base stations and on a two-dimensional component of the temporary position;
 a three-dimensional position computation unit to determine a three-dimensional position of the terminal using a three-dimensional component of the position of each of the plurality of base stations, the plurality of three-dimensional direction vectors, and a plurality of three-dimensional weights, wherein the plurality of three-dimensional weights are each a weight corresponding to the three-dimensional component of the position of each of the plurality of base stations and determined based on the three-dimensional component of the position of each of the plurality of base stations and on a three-dimensional component of the temporary position; and
 a position aggregation unit to determine a weighted mean of the two-dimensional position and a two-dimensional component of the three-dimensional position as a two-dimensional component of a position of the terminal, and to adopt a third-dimension component of the three-dimensional position as a third-dimension component of the position of the terminal.

Advantageous Effects of Invention

According to the present disclosure, the influence of an error contained in the three-dimensional position of the terminal is reduced by determining a position as an aggregation of the two-dimensional position of the terminal and the three-dimensional position of the terminal as the position of the terminal. Thus, according to the present disclosure, an error can be reduced when the shape of the area where the terminal is present is not a perfect cube in three-dimensional positioning of the terminal that uses the relative angle formed by each base station and the terminal.

DESCRIPTION OF EMBODIMENTS

Figure 1:
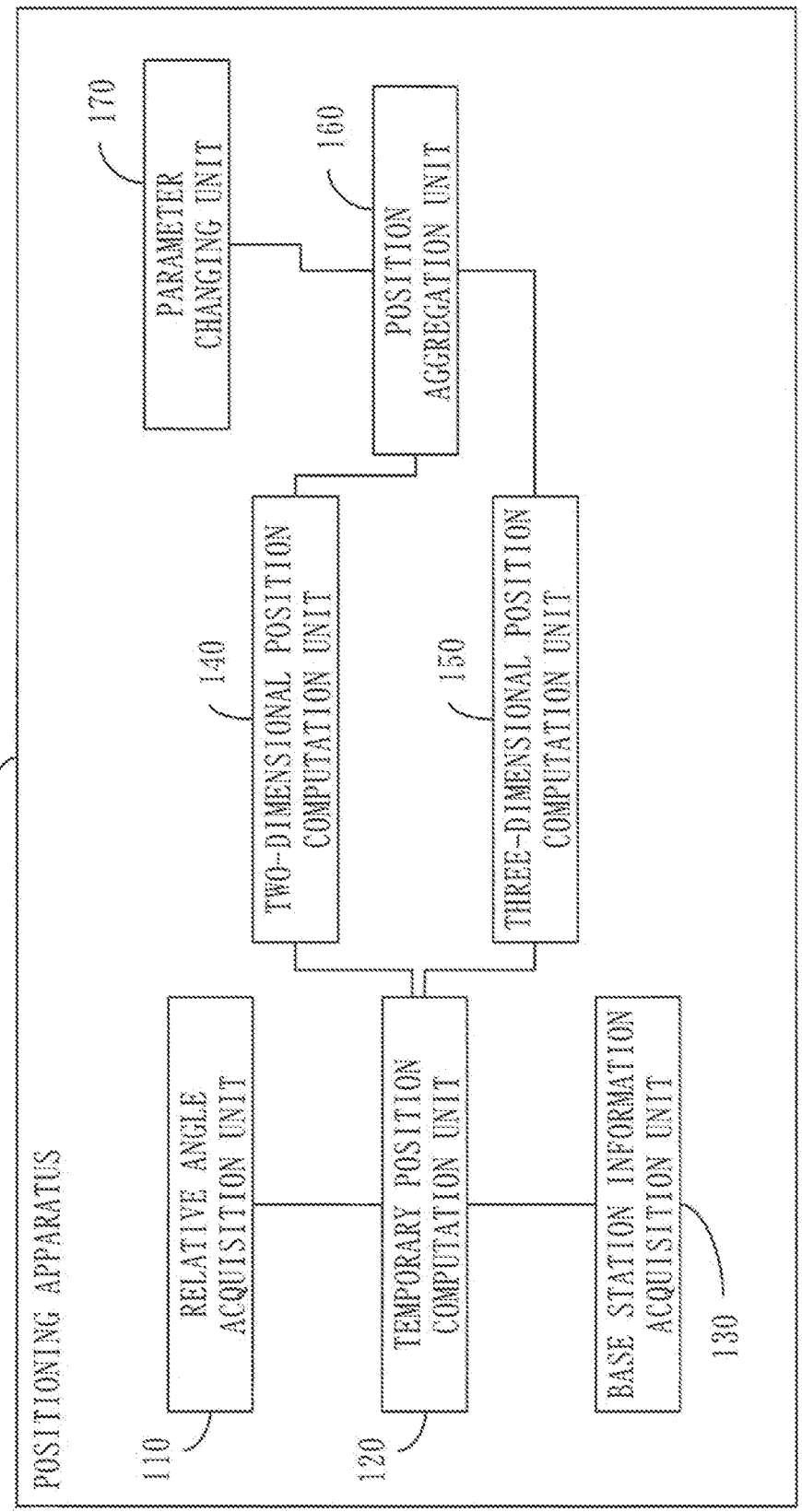
FIG. 1 shows a configuration example of a positioning apparatus 100 according to Embodiment 1.

In the description of embodiments and the drawings, the same elements and corresponding elements are given the same reference characters. Description of elements with the same reference characters are omitted or simplified as appropriate. Arrows in the drawings primarily indicate flows of data or flows of processing. Also, a "unit" may be read as a "circuit", "step", "procedure", "process", or "circuitry" as appropriate.

Embodiment 1

The present embodiment is described in detail below with reference to drawings.

*Description of Configuration*

FIG. 1 shows a configuration example of a positioning apparatus 100 according to the present embodiment. As shown in this drawing, the positioning apparatus 100 includes a relative angle acquisition unit 110, a temporary position computation unit 120, a base station information acquisition unit 130, a two-dimensional position computation unit 140, a three-dimensional position computation unit 150, a position aggregation unit 160, and a parameter changing unit 170. In this specification, three-dimensional positioning may be just referred to as positioning.

The positioning apparatus 100 is a device that estimates a three-dimensional position of a terminal in a case where a relative angle formed by the terminal and each of multiple base stations is being observed. Assume here that each of the multiple base stations is fixed within a space and the respective three-dimensional positions of the multiple base stations are known. Also, wireless communication is performed between the terminal and each of the multiple base stations and the relative angle formed by the terminal and each of the multiple base stations is observed based on wireless communication. The wireless communication is communication compliant with the Bluetooth (registered trademark) standard, as a specific example. There may be multiple terminals, in which case the positioning apparatus 100 estimates the position of each terminal. The description below assumes a three-dimensional space and an LOS (Line of Sight) environment.

The relative angle acquisition unit 110 acquires information showing the relative angle between the terminal and each base station.

The temporary position computation unit 120 computes a temporary position of the terminal based on the information acquired by the relative angle acquisition unit 110 and information acquired by the base station information acquisition unit 130. As a specific example, the temporary position computation unit 120 determines the temporary position of the terminal using multiple two-dimensional direction vectors and multiple three-dimensional direction vectors. The multiple two-dimensional direction vectors are vectors that are each computed using each of multiple observed angles which has been observed as an angle formed by the position of each of multiple base stations and a terminal communicating with each one of the multiple base stations in a three-dimensional space, the vectors being based on an angle for a two-dimensional direction of the multiple observed angles. The multiple three-dimensional direction vectors are vectors that are each computed using each of the multiple observed angles and are based on an angle for a three-dimensional direction of the multiple observed angles. A two-dimensional component is a component, that corresponds to a two-dimensional space, among the components of a vector. A three-dimensional component is a component, that corresponds to a three-dimensional space, among the components of a vector.

The base station information acquisition unit 130 acquires base station information corresponding to each base station. The base station information includes information showing the position of each base station and information showing a base station ID (Identifier).

The two-dimensional position computation unit 140 computes a two-dimensional position of the terminal based on the temporary position computed by the temporary position computation unit 120. A two-dimensional position is a position expressed in two-dimensional form. The two-dimensional position computation unit 140 determines the two-dimensional position of the terminal using the two-dimensional component of the position of each of the multiple base stations, the multiple two-dimensional direction vectors, and multiple two-dimensional weights. The multiple two-dimensional weights are each a weight corresponding to the two-dimensional component of the position of each of the multiple base stations and determined based on the two-dimensional component of the position of each of the multiple base stations and on the two-dimensional component of the temporary position. Each of the multiple two-dimensional weights may also be a value that is dependent on an inverse of a distance formed between the two-dimensional component of the position of each of the multiple base stations and the two-dimensional component of the temporary position.

The three-dimensional position computation unit 150 computes a three-dimensional position of the terminal based on the temporary position computed by the temporary position computation unit 120. A three-dimensional position is a position expressed in three-dimensional form. The three-dimensional position computation unit 150 determines the three-dimensional position of the terminal using the three-dimensional component of the position of each of the multiple base stations, the multiple three-dimensional direction vectors, and multiple three-dimensional weights. The multiple three-dimensional weights are each a weight corresponding to the three-dimensional component of the position of each of the multiple base stations and determined based on the three-dimensional component of the position of each of the multiple base stations and on the three-dimensional component of the temporary position. Each of the multiple three-dimensional weights may also be a value that is dependent on an inverse of a distance formed between the three-dimensional component of the position of each of the multiple base stations and the three-dimensional component of the temporary position.

The position aggregation unit 160 computes the position of the terminal by aggregating the two-dimensional position computed by the two-dimensional position computation unit 140 and the three-dimensional position computed by the three-dimensional post ion computation unit 150.

The parameter changing unit 170 changes the value of a parameter used by the position aggregation unit 160 appropriately. As a specific example, the parameter changing unit 170 changes the value of a weighted mean parameter, which is a parameter used with a weighted mean, to a value that is dependent on the shape of a target area. The target area is an area where the terminal is located and the area is defined based on the temporary position. The parameter changing unit 170 may also change the value of the weighted mean parameter in accordance with a ratio of a length of the target area in a shorter direction to a length of the target area in a longer direction and a ratio between a diagonal length of the target area in two dimensions and a height of the target area. The parameter changing unit 170 may also change the value of the weighted mean parameter with reference to a lookup table that shows values of the weighted mean parameter on a condition by condition basis.

Various types can be contemplated for possible configuration examples of a positioning system 90 including the positioning apparatus 100. A representative configuration example of the positioning system 90 is described below with reference to drawings. The positioning apparatus 100 is provided in any of the components shown in each example or by being distributed in at least any of the components as appropriate.

Figure 2:
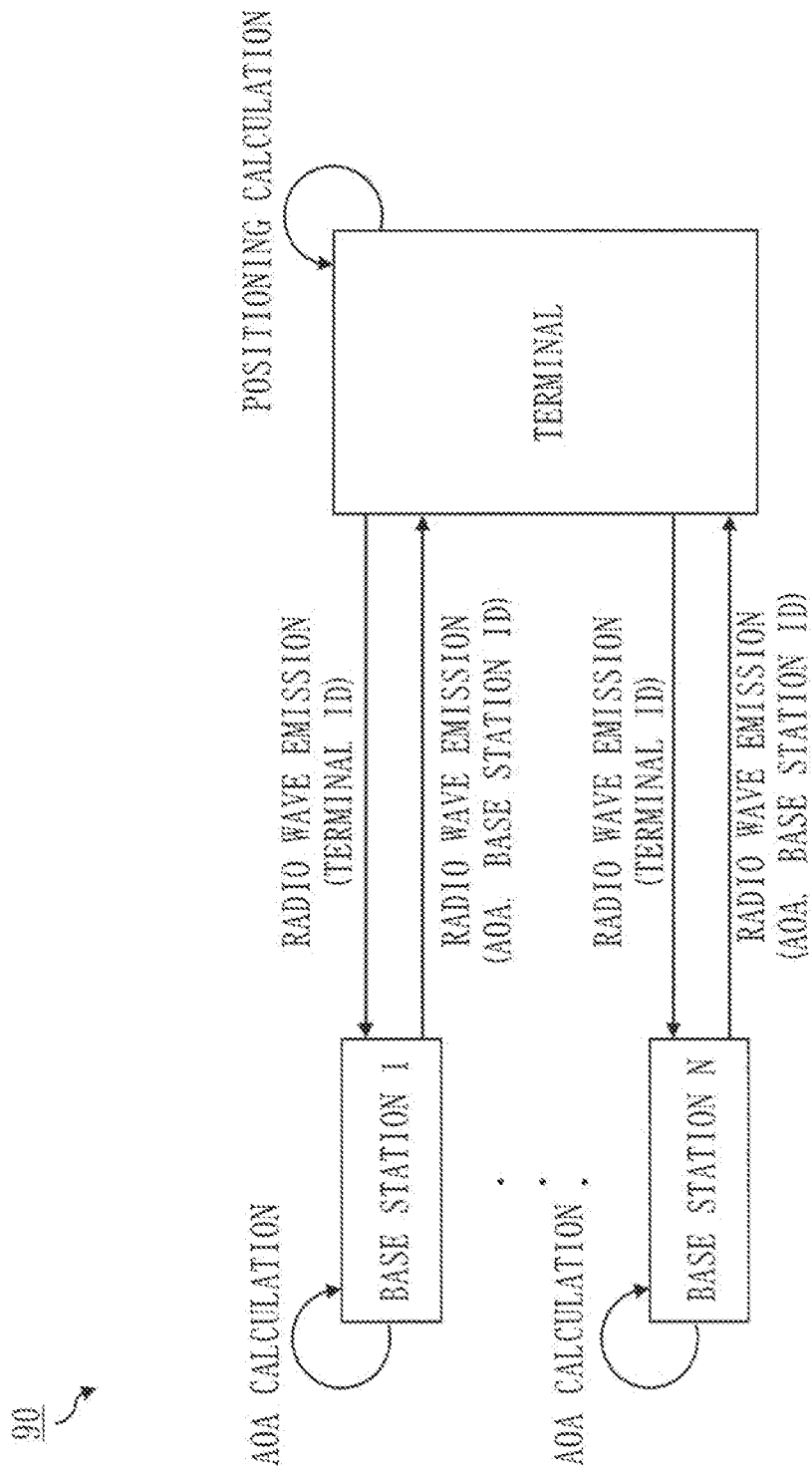
FIG. 2 shows a configuration example of a positioning system 90 according to Embodiment 1.

FIG. 2 shows a specific example of the positioning system 90. The positioning system 90 includes N (N being an integer equal to or greater than 2) base stations and a terminal.

In this example, the terminal first transmits information showing its terminal ID to each base station. Then, each base station receives the information showing the terminal ID from the terminal, performs an AOA (Angle-Of-Arrival) calculation based on the received information and observation data of each base station, and transmits information showing each of the result of the ADA calculation and its base station ID to the terminal. Next, the terminal performs a positioning calculation based on the information received from the respective base stations. Here, the positioning calculation is a calculation related to three-dimensional positioning of the terminal.

Figure 3:
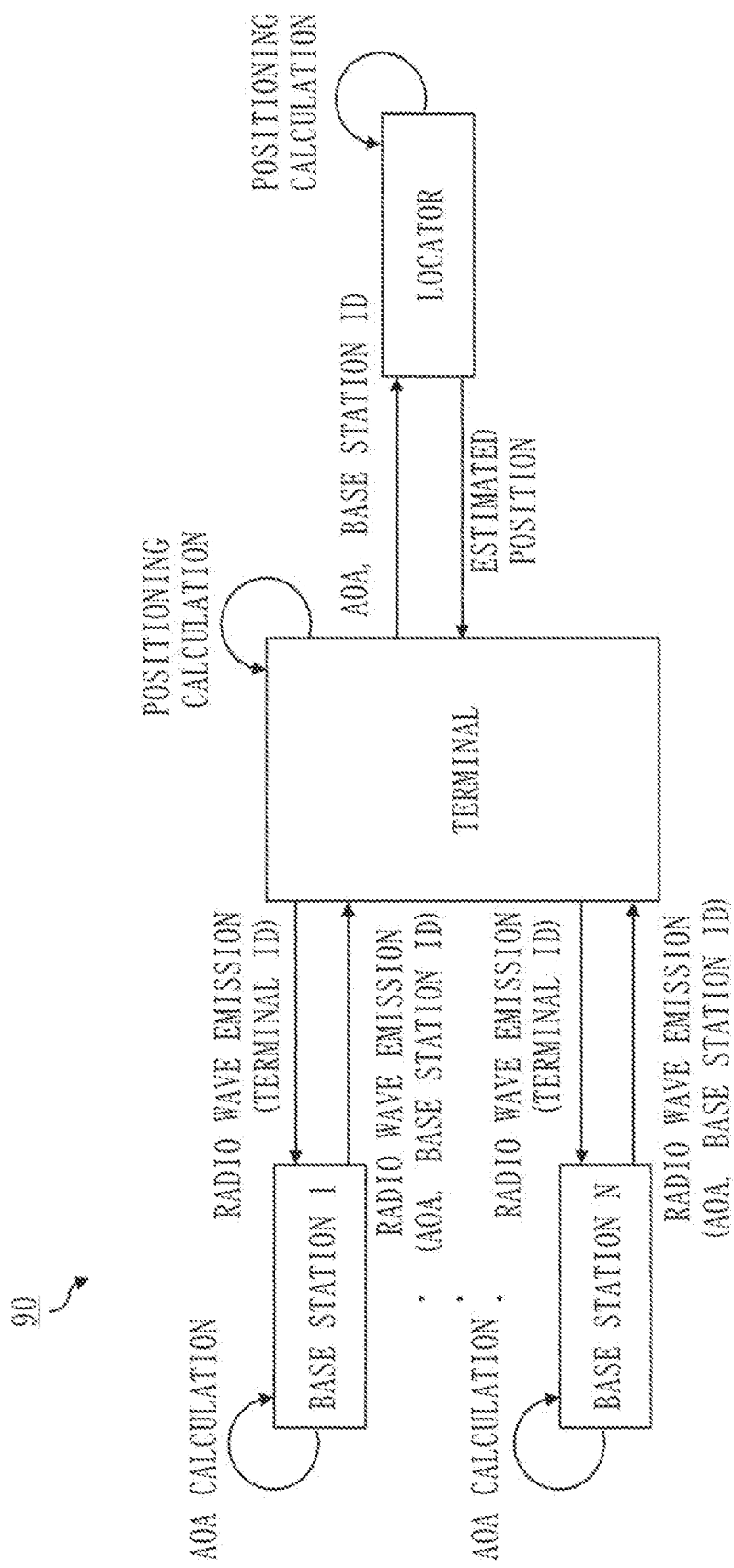
FIG. 3 shows a configuration example of the positioning system 90 according to Embodiment 1.

FIG. 3 shows a specific example of the positioning system 90. For the positioning system 90 of FIG. 3, differences from the positioning system 90 shown in FIG. 2 are primarily described. The positioning system 90 further includes a locator to execute a portion of positioning calculation. The locator is a dedicated device for performing positioning calculations.

In this example, the terminal transmits the information received from each base station to the locator in order to delegate the execution of a portion of positioning calculation to the locator. The locator executes the portion of positioning calculation based on the information received from the terminal and transmits the result of executing the portion of positioning calculation to the terminal. Then, the terminal executes the portion of the positioning calculation that has not been delegated to the locator based on the information received from each base station and the information received from the locator.

Figure 4:
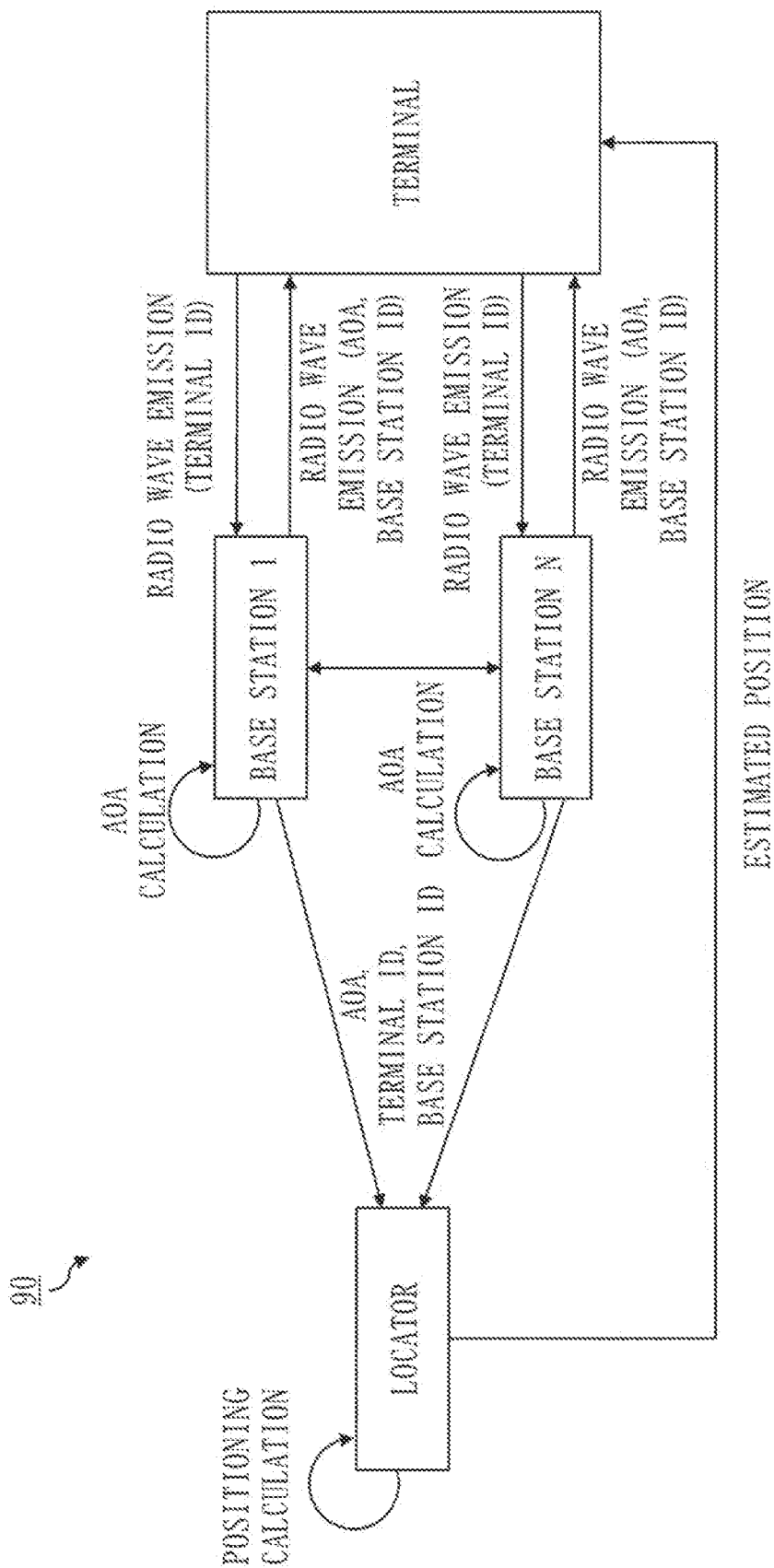
FIG. 4 shows a configuration example of the positioning system 90 according to Embodiment 1.

FIG. 4 shows a specific example of the positioning system 90. For the positioning system 90 of FIG. 4, differences from the positioning system 90 shown in FIG. 3 are primarily described. The locator receives information showing each of the terminal ID, the result of the AOA calculation, and the base station ID from each base station, executes a positioning calculation based on the received information, and transmits the result of the positioning calculation to the terminal. The terminal does not perform positioning calculation.

Figure 5:
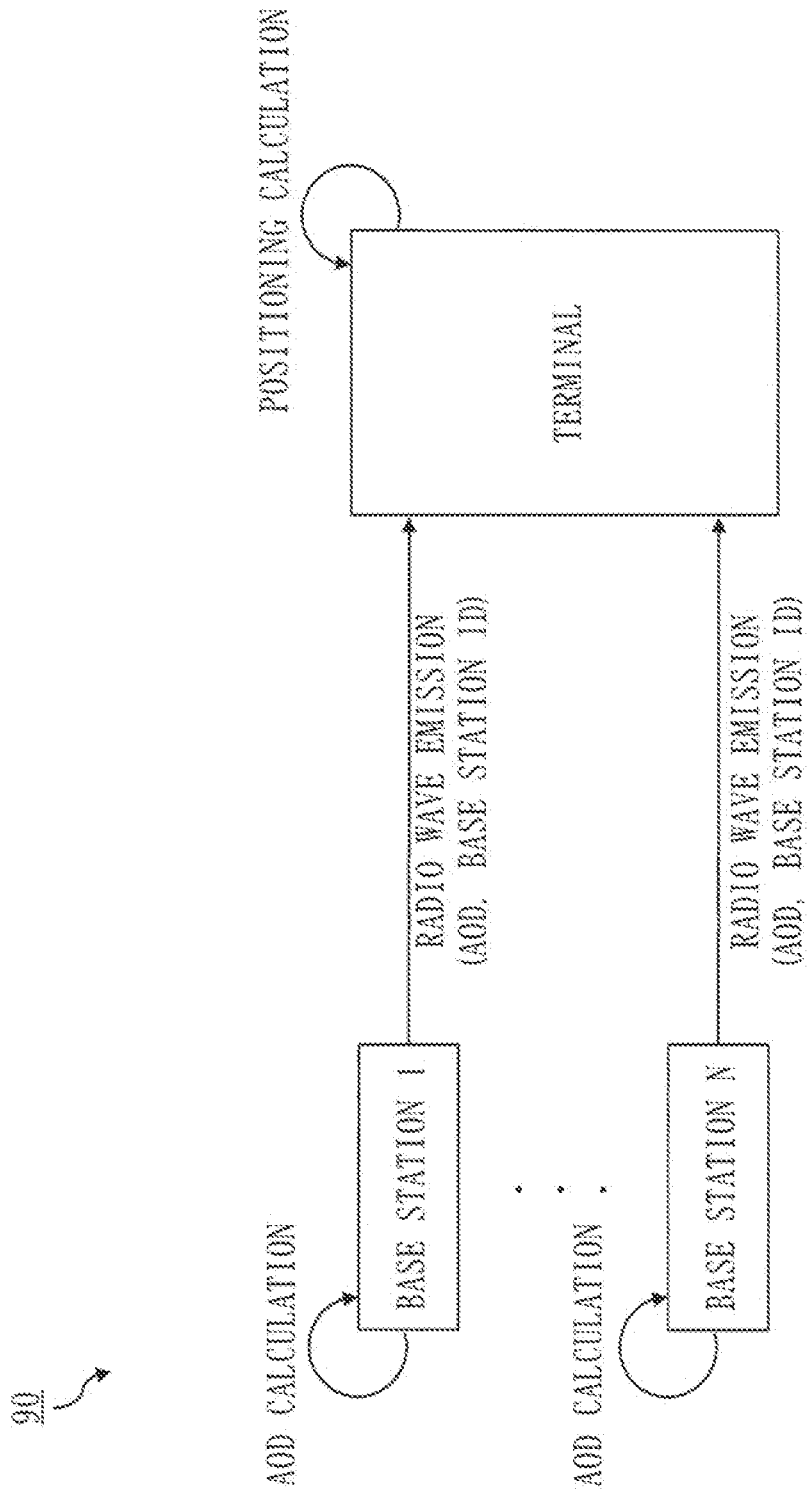
FIG. 5 shows a configuration example of the positioning system 90 according to Embodiment 1.

FIG. 5 shows a specific example of the positioning system 90. The positioning system 90 includes N base stations and a terminal.

In this example, each base station first performs an AOD (Angle-Of-Departure) calculation and transmits information showing each of the result of the AOD calculation and the base station ID to the terminal. Then, the terminal performs a positioning calculation based on the information received from the respective base stations.

Figure 6:
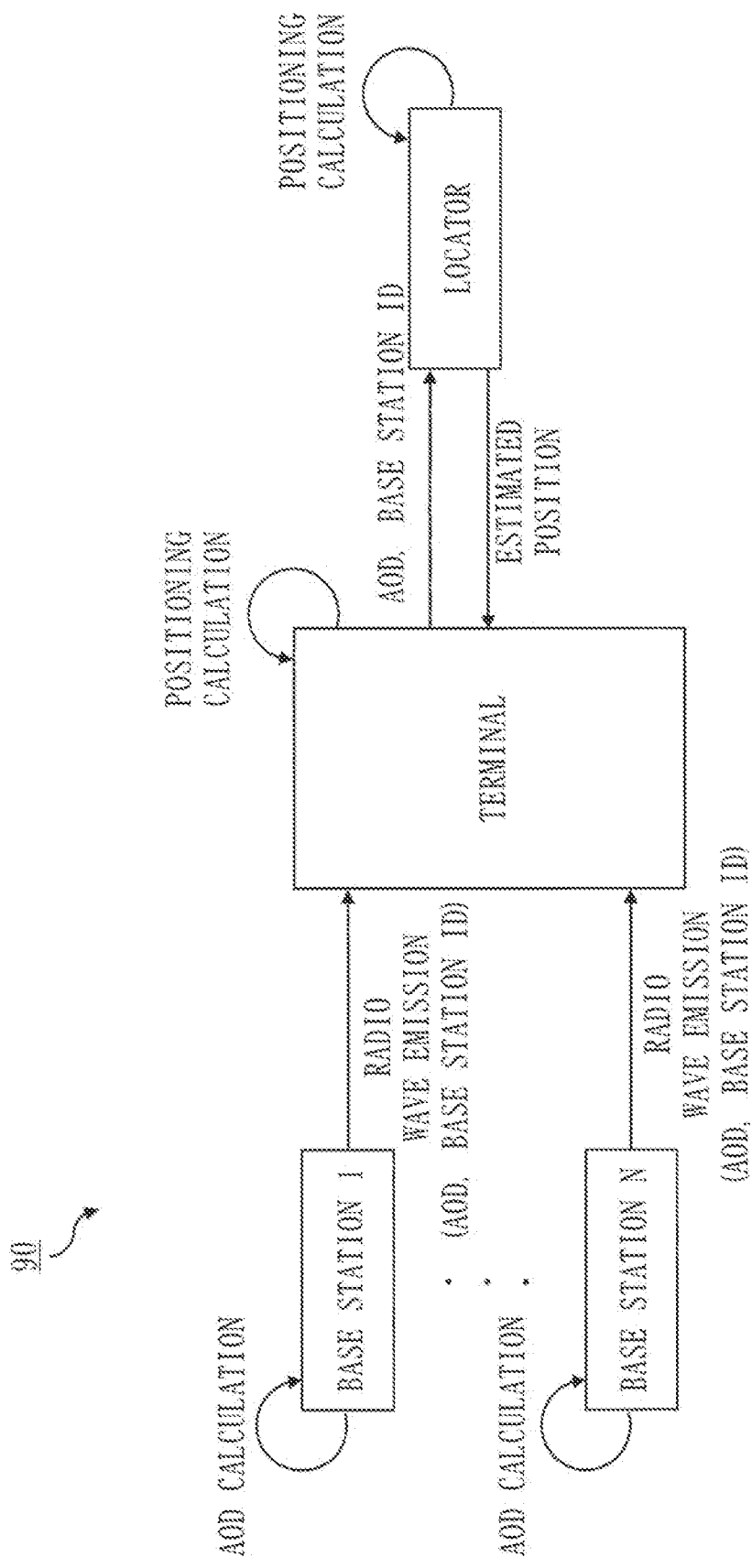
FIG. 6 shows a configuration example of the positioning system 90 according to Embodiment 1.

FIG. 6 shows a specific example of the positioning system 90. For the positioning system 90 of FIG. 6, differences from the positioning system 90 shown in FIG. 5 are primarily described. The positioning system 90 further includes a locator.

The operations of the positioning system 90 according to this example are operations that appropriately combine operations of the positioning system 90 shown in FIG. 3 and operations of the positioning system 90 shown. FIG. 5.

Figure 7:
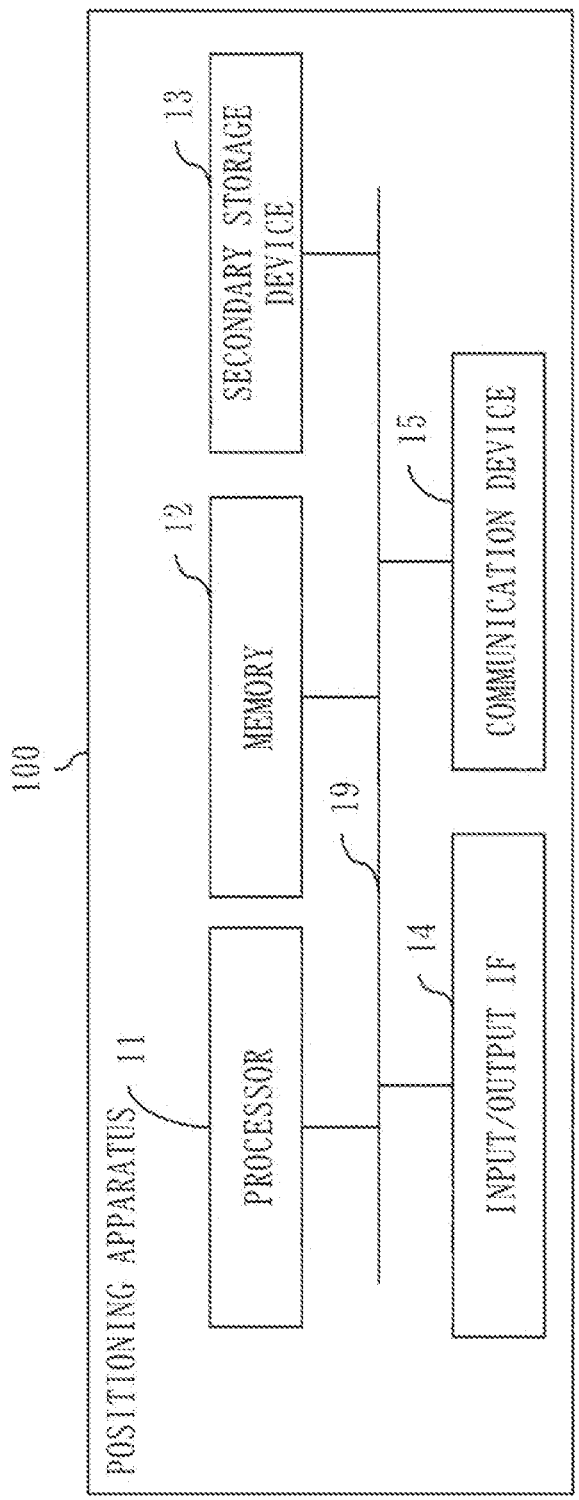
FIG. 7 shows an example of hardware configuration of the positioning apparatus 100 according to Embodiment 1.

FIG. 7 shows an example of hardware configuration of the positioning apparatus 100 according to the present embodiment. The positioning apparatus 100 is composed of a computer. The positioning apparatus 100 may also be composed of multiple computers.

The positioning apparatus 100 is a computer equipped with pieces of hardware including a processor 11, a memory 12, a secondary storage device 13, an input/output IF (Interface) 14, and a communication device 15, as shown in the drawing. These pieces of hardware are connected appropriately via a signal line 19.

The processor 11 is an IC (Integrated Circuit) that performs arithmetic processing and controls the hardware included in the computer. The processor 11 is a CPU (Central Processing Unit), a DSP (Digital Signal Processor), or a GPU (Graphics Processing Unit), as specific examples.

The positioning apparatus 100 may include multiple processors to replace the processor 11. The multiple processors share the role of the processor 11.

The memory 12 is typically a volatile storage device. The memory 12 is also called a main storage device or a main memory. The memory 12 is a RAM (Random Access Memory), as a specific example. Data stored in the memory 12 is saved in the secondary storage device 13 as necessary.

The secondary storage device 13 is typically a non-volatile storage device. The secondary storage device 13 is a ROM (Read Only Memory), an HDD (Hard Disk Drive), or a flash memory, as specific examples. Data stored in the secondary storage device 13 is loaded into the memory 12 as necessary.

The memory 12 and the secondary storage device 13 may be integrally configured.

The input/output IF 14 is a port to which input devices and output devices are connected. The input/output IF 14 is a USB (Universal Serial Bus) terminal, as a specific example.

The input devices are a keyboard and a mouse, as specific examples. The output device is a display, as a specific example.

The communication device 15 is a receiver and transmitter. The communication device 15 is a communication chip or a NIC (Network Interface Card), as specific examples.

The components of the positioning apparatus 100 may use the input/output IF 14 and the communication device 15 as necessary when communicating with other devices or the like.

The secondary storage device 13 stores a positioning program. The positioning program is a program that causes a computer to implement the functions of the components included in the positioning apparatus 100. The positioning program is loaded to the memory 12 and executed by the processor 11. The functions of the components included in the positioning apparatus 100 are implemented by software.

Data for use in the execution of the positioning program and data resulting from the execution of the positioning program are stored in a storage device as necessary. The components of the positioning apparatus 100 utilize the storage device as necessary. The storage device is formed from at least one of the memory 12, the secondary storage device 13, a register in the processor 11, and a cache memory in the processor 11, as specific examples. Note that data and information can have equivalent meaning. The storage device may be independent from the computer.

The functions of the memory 12 and the secondary storage device 13 may be implemented by other storage devices.

The positioning program may be recorded in a computer-readable, non-volatile recording medium. The non-volatile recording medium is an optical disk or a flash memory, as specific examples. The positioning program may be provided as a program product.

\*\*\*Description of Operation\*\*\*

An operational procedure of the positioning apparatus 100 corresponds to the positioning method. Also, a program for implementing the operation of the positioning apparatus 100 corresponds to the positioning program.

Figure 8:
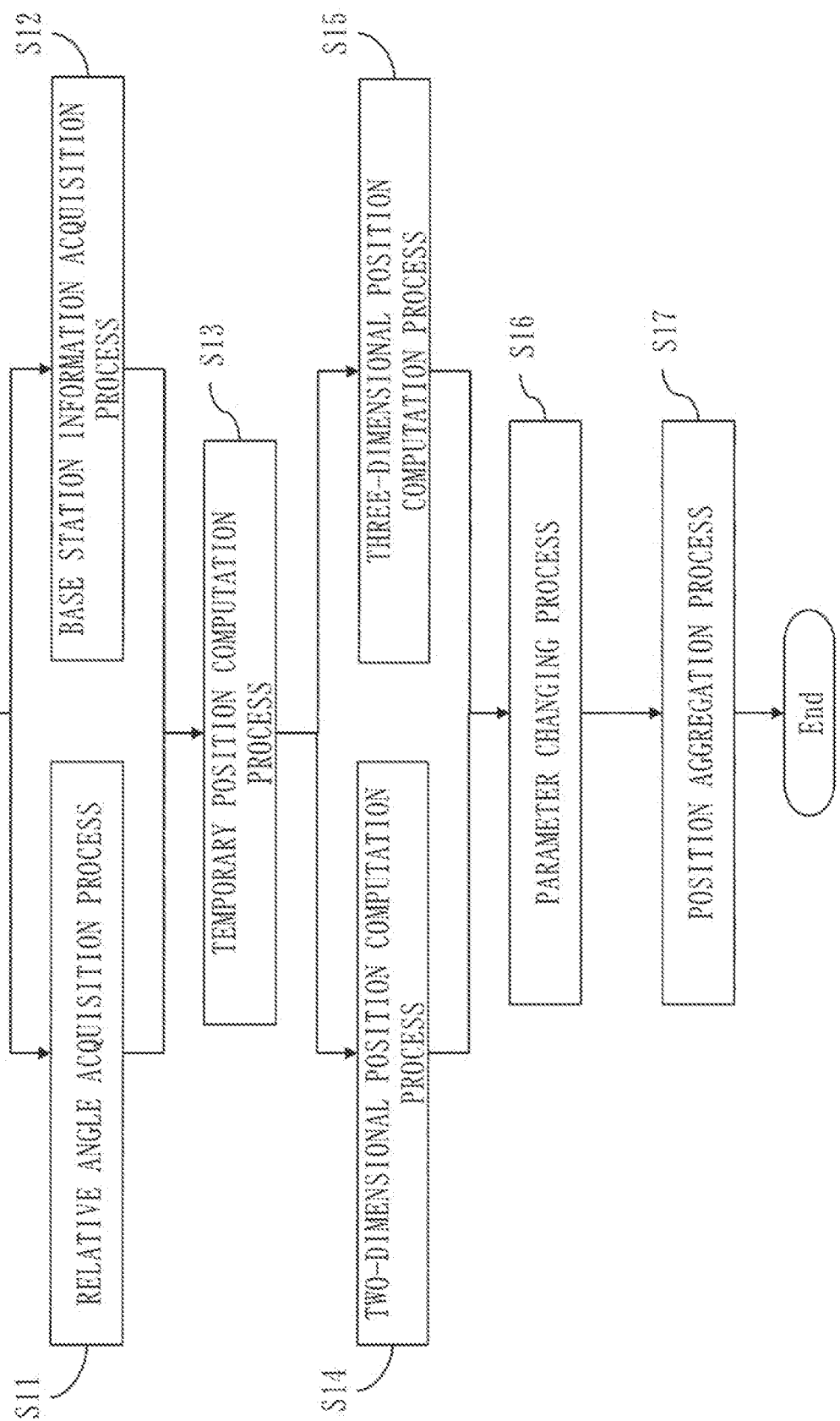
FIG. 8 is a flowchart illustrating operation of the positioning apparatus 100 according to Embodiment 1.

FIG. 8 is a flowchart illustrating an example of the operation of the positioning apparatus 100. Referring to this drawing, the operation of the positioning apparatus 100 is described.

(Step S11)

The relative angle acquisition unit 110 acquires information showing the relative angle between a terminal and each base station.

(Step S12)

The base station information acquisition unit 130 acquires base station information corresponding to each base station.

(Step S13)

The temporary position computation unit 120 computes a temporary position of the terminal based on the information showing the relative angle acquired by the relative angle acquisition unit 110 and the base station information acquired by the base station information acquisition unit 130.

Figure 9:
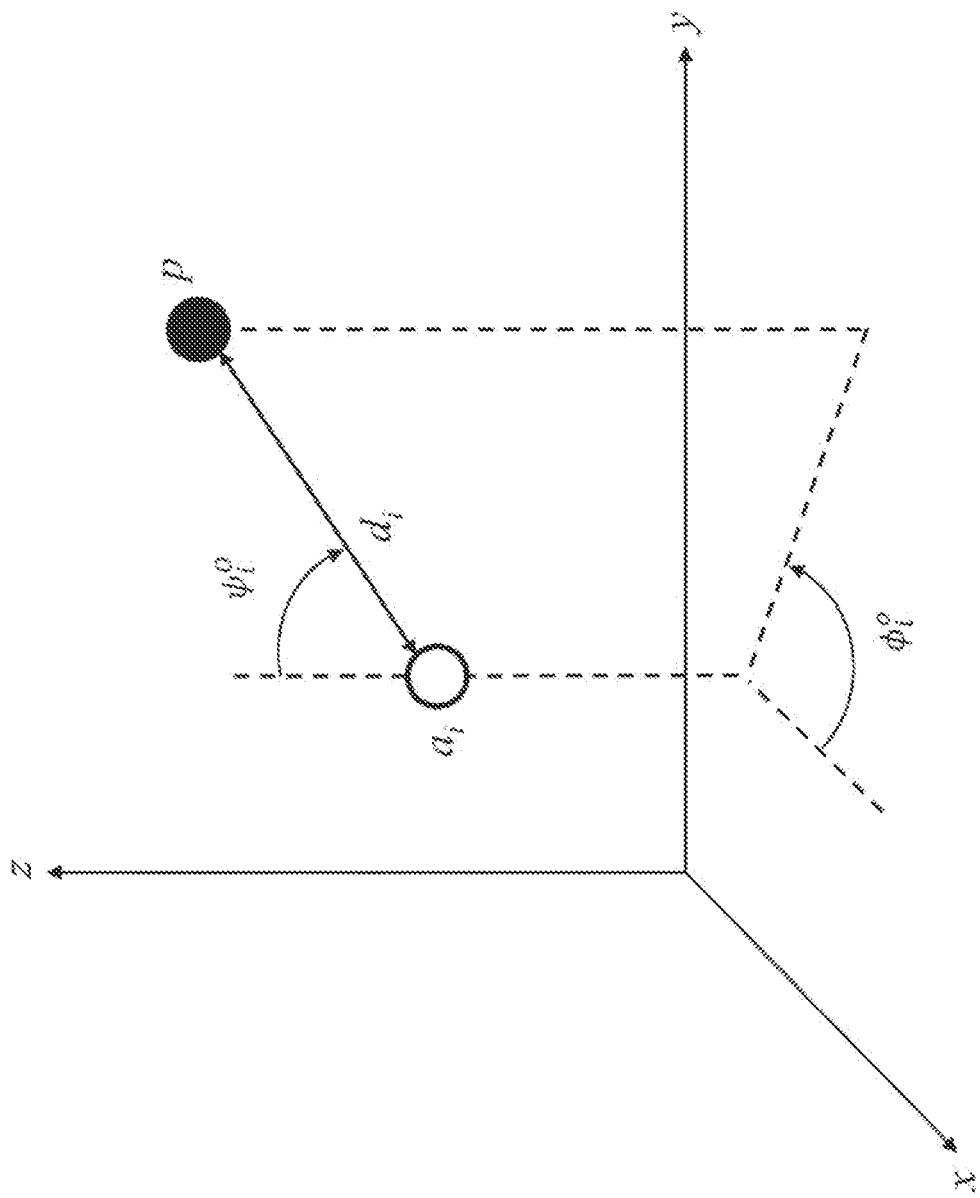
FIG. 9 shows a specific example of positional relationship between a terminal and a base station.

Here, an example of computing a temporary position is described. FORMULA 1 represents the position of each base station and FORMULA 2 represents the true position of the terminal. FORMULA 3 represents the true value of AOA. Here, $\phi_i^o$ represents the true azimuth and $\psi_i^o$ represents the true elevation angle. FIG. 9 uses these symbols to show a specific example of the positional relationship between the terminal and the base station corresponding to index i.

$$a_i = [x_i, y_i, z_i]^T \in \mathbb{R}^3, \text{ for } i = 1, \ldots, N, \quad \text{FORMULA 1}$$

$$p = [x_o, y_o, z_o]^T \in \mathbb{R}^3, \quad \text{FORMULA 2}$$

$$\phi_i^o = \arctan\left(\frac{y_o - y_i}{x_o - x_i}\right), \quad \text{FORMULA 3}$$

$$\psi_i^o = \arccos\left(\frac{z_o - z_i}{d_i}\right), d_i = \|p - a_i\|.$$

Then, the temporary position computation unit 120 computes the temporary position as shown in FORMULA 4. Here, the symbols in FORMULA 4 are as shown in FORMULA 5. $c_{1i}$ corresponds to a two-dimensional direction vector. $c_{2i}$ corresponds to a three-dimensional direction vector. $\phi_i$ corresponds to an angle for a two-dimensional direction. $\phi_i$ and $\psi_i$ correspond to angles for three-dimensional directions.

$$\hat{p}_{LS} = (A^T A)^{-1} A^T b \in \mathbb{R}^3 \quad \text{FORMULA 4}$$

$$c_{1i} = [-\sin(\phi_i), \cos(\phi_i), 0]^T \in \mathbb{R}^3, \quad \text{FORMULA 5}$$

$$c_{2i} = [\cos(\phi_i)\cos(\psi_i), \sin(\phi_i)\cos(\psi_i), -\sin(\psi_i)]^T \in \mathbb{R}^3,$$

$$A = \begin{bmatrix} c_{11}^T \\ \vdots \\ c_{1N}^T \\ c_{21}^T \\ \vdots \\ c_{2N}^T \end{bmatrix} \in \mathbb{R}^{2N \times 3}, b = \begin{bmatrix} c_{11}^T a_1 \\ \vdots \\ c_{1N}^T a_N \\ c_{21}^T a_1 \\ \vdots \\ c_{2N}^T a_N \end{bmatrix} \in \mathbb{R}^{2N},$$

(Step S14)

The two-dimensional position computation unit 140 computes the two-dimensional position of the terminal based on the temporary position computed by the temporary position computation unit 120.

Here, an example of computing the two-dimensional position of the terminal is described. The two-dimensional position computation unit 140 computes the two-dimensional position of the terminal as shown in FORMULA 6. Here, the symbols in FORMULA 6 are as shown in FORMULA 7. Insofar as $c_{1i}$, $c_{2i}$, and $\tilde{c}_{1i}$ are orthogonal vectors, the signs of these terms may be inverted. Because of the characters that can be used, symbols shown in formulas may be indicated in the text with some deformation, corresponds to a two-dimensional weight, $a_i(1:2)$ indicates the two-dimensional component of the position of each base station. $\tilde{c}_{1i}$ corresponds to a two-dimensional direction vector.

$$\hat{p}_{TELS(2D)} = (\tilde{A}^T \tilde{W} \tilde{A})^{-1} \tilde{A}^T \tilde{W} \tilde{b} \in \mathbb{R}^2 \quad \text{FORMULA 6}$$

$$\tilde{W} = \text{diag}(w_{11}, \ldots, w_{1N}) \in \mathbb{R}^{N \times N}, \quad \text{FORMULA 7}$$

$$w_{1i} = \frac{\sigma}{V[\epsilon_{1i}]} \triangleq \frac{1}{\|\hat{p}_{LS}(1:2) - a_i(1:2)\|^2},$$

$$\tilde{c}_{1i} = [-\sin(\phi_i), \cos(\phi_i)]^R \in \mathbb{R}^2,$$

$$\tilde{A} = \begin{bmatrix} \tilde{c}_{11}^T \\ \vdots \\ \tilde{c}_{1N}^T \end{bmatrix} \in \mathbb{R}^{N \times 2}, \tilde{b} = \begin{bmatrix} \tilde{c}_{11}^T a_1(1:2) \\ \vdots \\ \tilde{c}_{1N}^T a_N(1:2) \end{bmatrix} \in \mathbb{R}^N.$$

(Step S15)

The three-dimensional position computation unit 150 computes the three-dimensional position of the terminal based on the temporary position computed by the temporary position computation unit 120.

Here, an example of computing the three-dimensional position of the terminal is described. The three-dimensional position computation unit 150 computes the three-dimensional position of the terminal as shown in FORMULA 8. Here, the symbols in FORMULA 8 are as shown in FORMULA 9. $w_{2i}$ corresponds to a three-dimensional weight. $a_i$ indicates the three-dimensional component of the position of each base station.

$$\hat{p}_{TELS} = (A^T W A)^{-1} A^T W b \in \mathbb{R}^3 \quad \text{FORMULA 8}$$

$$W = \text{diag}(w_{11}, \ldots, w_{1N}, w_{21}, \ldots, w_{2n}) \in \mathbb{R}^{2N \times 2N}, \quad \text{FORMULA 9}$$

$$w_{2i} = \frac{\sigma}{V[\epsilon_{2i}]} \cong \frac{1}{\|\hat{p}_{LS} - a_i\|^2}.$$

(Step S16)

Figure 10:
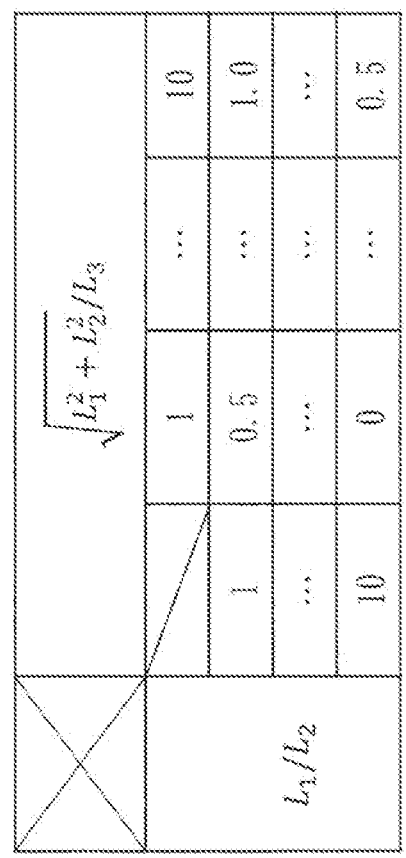
FIG. 10 shows a specific example of a lookup table.
Figure 11:
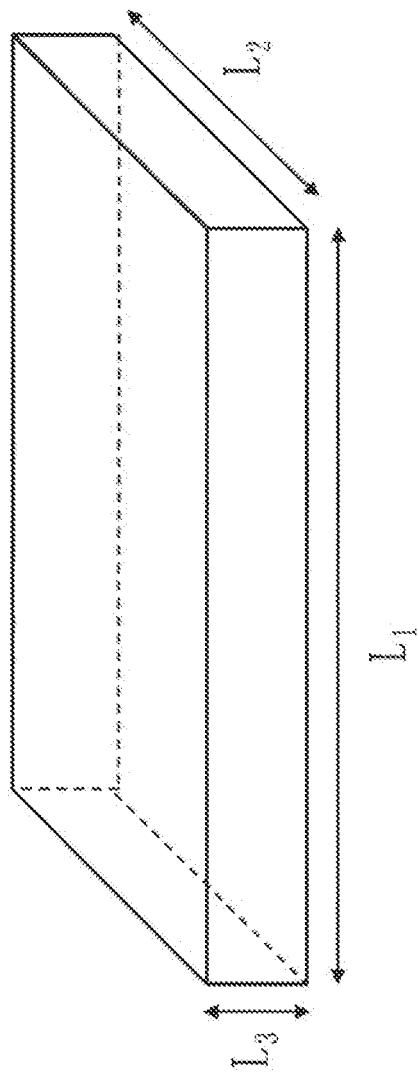
FIG. 11 shows a specific example of an area in which a terminal is located.

The parameter changing unit 170 changes the value of a parameter used by the position aggregation unit 160. As a specific example, the parameter changing unit 170 changes the value of a parameter shown in FORMULA 10. The parameter μ corresponds to a weighted mean parameter. As a specific example, a lookup table such as shown in FIG. 10 is prepared based on a previously performed simulation and the like, and the parameter changing unit 170 changes the value of the parameter μ in accordance with the prepared lookup table. Here, the symbols shown in FIG. 10 indicate the respective lengths of the sides of the area in which the terminal is located. The area is an area of a rectangular parallelepiped shape defined so as to contain the temporary position of the terminal, and the area may not contain all of the base stations and be different from the shape of the space in which the terminal is located. Also, the parameter changing unit 170 may compute values in accordance with the computation shown in the vertical axis of the drawing and the computation shown in the horizontal axis and, in doing so, may round the computed values. Note that sqrt($L_1\wedge 2 + L_2\wedge 2$) corresponds to a diagonal length of the target area in two dimensions, FIG. 11 shows a specific example of the area. $L_1$ represents the length of the area in the longer direction, $L_2$ represents the length of the area in the shorter direction, and $L_1$ represents the height of the area. The height may not be the length of the area in the vertical direction. As a specific example, the parameter changing unit 170 determines $L_1$, $L_2$, and $L_3$ based on the temporary position computed by the temporary position computation unit 120 and the position of each base station.

(Step S17)

The position aggregation unit 160 computes the position of the terminal by aggregating the two-dimensional position and the three-dimensional position. When the number of AOAs or AODs that can be acquired is low, for example, calculation by at least one of the temporary position computation unit 120, the two-dimensional position computation unit 140, and the three-dimensional position computation unit 150 can fail, if calculation by at least one of them has failed, the positioning apparatus 100 outputs a value from which it can be known that positioning calculation has failed as a result of the positioning calculation. The value can be Null or [−999, −999, −999], as specific examples.

An example of computing the position of the terminal by the position aggregation unit 160 is now described. The position aggregation unit 160 computes the position of the terminal as shown in FORMULA 10. If the position aggregation unit 160 employs FORMULA 10, the position aggregation unit 160 determines a weighted mean of the two-dimensional position and the two-dimensional component of the three-dimensional position as the two-dimensional component of the position of the terminal, and adopts a third-dimension component of the three-dimensional position as a third-dimension component of the position of the terminal.

$$\hat{p}_{ITELS} = [\mu \hat{p}_{TELS(2D)}{}^T(1:2) + (1-\mu)\hat{p}_{TELS}{}^T(1:2), \hat{p}_{TELS}(3)]$$
$$T \in \mathbb{R}^3, 0 \leq \mu \leq 1. \quad \text{FORMULA 10}$$

Description of the Effects of Embodiment 1

First, a possibility that the positioning accuracy of the terminal position can degrade depending on the magnitude of at least either of the value of $L_1/L_2$ and the value of (sqrt($L_1\wedge 2 + L_2\wedge 2$))/$L_3$ is described.

The first component of the orthogonal vector $c_{1i}$ contains $\sin(\phi_i)$. Subjecting $\sin(\phi_i)$ to Taylor expansion about the true value and approximating it with first-order terms yields FORMULA 11. Here, consider no and $\cos(\phi_i°)$, which are deviations due to a measurement error of AOA.

$$\sin(\phi_i) \cong \sin(\phi_i°) + \sin_{\phi_i} \cos(\phi_i°) \quad \text{FORMULA 11}$$

First, consider $n_{\phi i}$. The no is the measurement error itself. Accordingly, the greater the value of a standard deviation $\sigma_{\phi i}$ of the measurement error, the greater the absolute value of $n_{\phi i}$.

Next, consider $\cos(\phi_i°)$. Since the N base stations are independent, an expected value of possible $|\cos(\phi_i°)|$ can be represented as FORMULA 12, it is assumed here that the terminal and the base stations are located randomly in the space.

Figure 12:
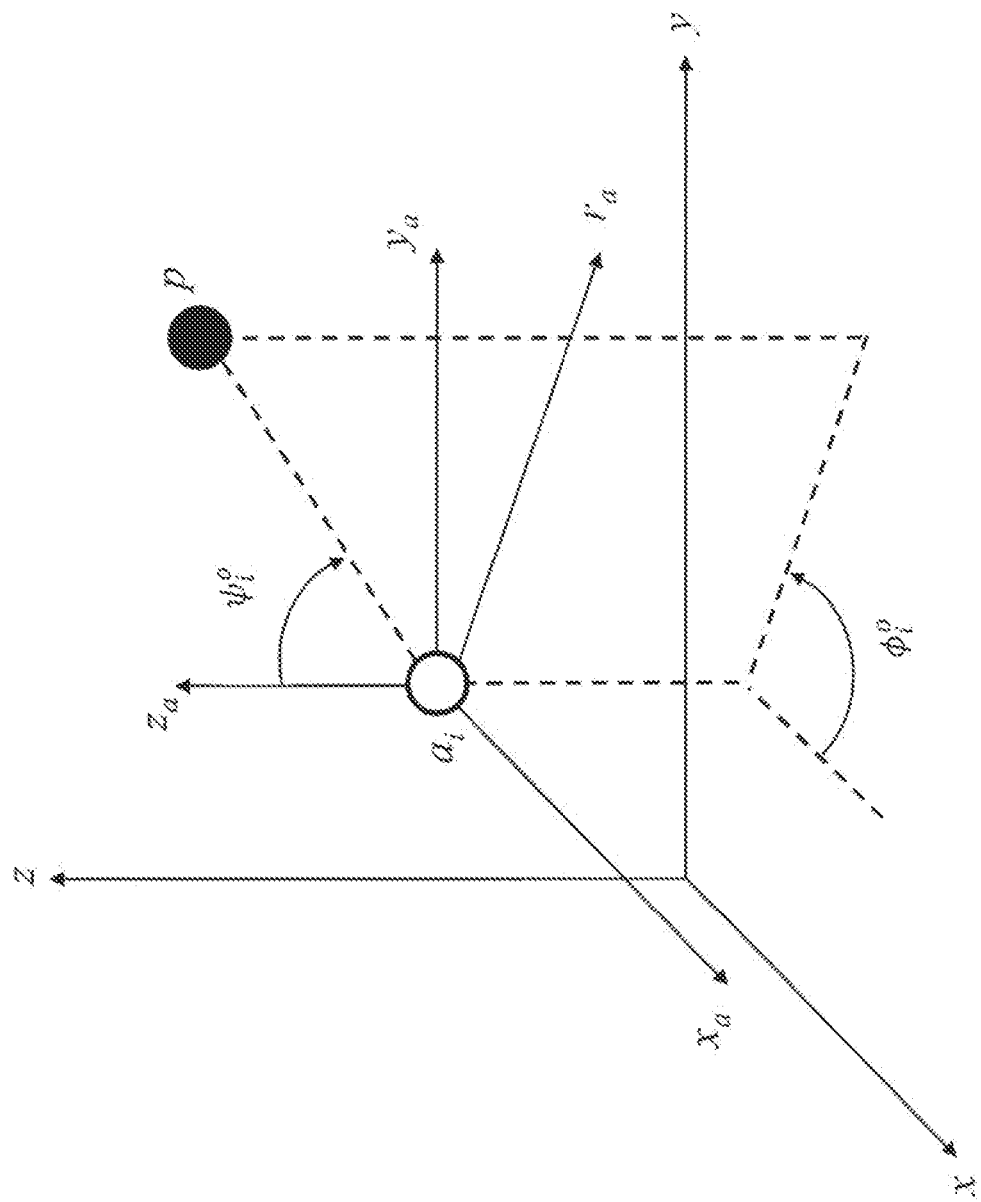
FIG. 12 shows a specific example of positional relationship between a terminal and a base station.

The relationship between the azimuth and a coordinate system is as shown in FIG. 12.

$$\frac{1}{N}\sum_{i=1}^{N} E[|\cos(\phi_i^o)|] = E[|\cos(\phi_i^o)|] \quad \text{FORMULA 12}$$

$$= \frac{1}{vol(\mathcal{D}_1)} \int\int_{\mathcal{D}_1} \frac{x_a}{\sqrt{x_a^2 + y_a^2}} dx_a dy_a$$

$$= \frac{1}{2}\left(\sqrt{1+u^2} + \frac{1}{u}\log\left(u + \sqrt{1+u^2}\right) - u\right)$$

$$= f(u),$$

where $\mathcal{D}_1 = [0, L_1] \times [0, L_2], u = \frac{L_2}{L_1}.$

Next, determining the differential of f(u) in order to ascertain the relationship between f(u) and u yields FORMULA 13.

$$f'(u) = \frac{u\sqrt{1+u^2} - u^2 - \log\left(u + \sqrt{1+u^2}\right)}{2u^2} \quad \text{FORMULA 13}$$

$$= \frac{f_1(u)}{f_2(u)}$$

The denominator, $f_2(u)$, of FORMULA 13 always assumes a positive value. So, determining the differential of the numerator, $f_1(u)$, of FORMULA 13 yields FORMULA 14.

$$f_1'(u) = \frac{2u(u - \sqrt{1+u^2})}{\sqrt{1+u^2}} \quad \text{FORMULA 14}$$

With $u>1$, $f_1'(u)$ always assumes a negative value. Thus, with $u>1$, $f_1(u)$ is a monotone decreasing function. Also, since $f_1(1)=\mathrm{sqrt}(2)-1-\log(1+\mathrm{sqrt}(2))<0$, $f(u)$ always assumes a negative value with $u>1$. Thus, with $u>1$, $f(u)$ is a monotone decreasing function. From this, as the value of $u=L_2/L_1$ becomes greater, the value of $E[|\cos(\phi_i°)|]$ becomes smaller; in other words, as the value of $1/u=L_1/L_2$ becomes greater, the value of $E[|\cos(\phi_i°)|]$ becomes greater.

From the result above, it can be said that when the value of GO is great or when the value of $L_1/L_2$ is great, the value of $\sin(i)$ can significantly deviate with respect to the true value. Accordingly, it is considered that combined use of $c_{1i}$ and $c_{2i}$ relatively reduces the influence of $\sin(i)$, so that the positioning accuracy of the terminal position becomes high.

The first and second components of the orthogonal vector $c_{2i}$ used in the TELS (Two-step Error variance-weighted Least Squares) disclosed by Non-Patent Literature 1 contain $\cos(\psi_i)$. Subjecting $\cos(\psi_i)$ to Taylor expansion about the true value and approximating it with first-order terms yields FORMULA 15. Here, consider $n_{\psi i}$ and $\sin(\psi_i°)$, which are deviations due to a measurement error of AOA.

$$\cos(\psi_i) \cong \cos(\omega_i°) - n_{\psi i} \sin(\psi_i°) \quad \text{FORMULA 15}$$

First, consider $n_{\psi i}$. The $n_{\psi i}$ is the measurement error itself. Accordingly, the greater the value of a standard deviation $\sigma_{\psi i}$ of the measurement error, the greater the absolute value of $n_{\psi i}$.

Next, consider $\sin(\psi_i°)$. Since the N base stations are independent, an expected value of possible $|\sin(\psi_i°)|$ can be represented as FORMULA 16. It is assumed here that the terminal and the base stations are located randomly in the space. Also, the relationship between the elevation angle and the coordinate system is as shown in FIG. 12.

$$\frac{1}{N}\sum_{i=1}^{N} E[|\sin(\psi_i°)|] = E[|\sin(\psi_i°)|] \quad \text{FORMULA 16}$$

$$= \frac{1}{vol(\mathcal{D}_2)} \int \int_{\mathcal{D}_2} \frac{r_a}{\sqrt{r_a^2 + z_a^2}} dr_a dz_a$$

$$= \frac{1}{2}\left(\sqrt{1+v^2} + \frac{1}{v}\log(v + \sqrt{1+v^2}) - v\right)$$

$$= f(v),$$

where $\mathcal{D}_2 = \left[0, \sqrt{L_1^2 + L_2^2}\right] \times [0, L_3]$, $v = \frac{L_3}{\sqrt{L_1^2 + L_2^2}}$ From the result above, when the value of $\sigma_{\psi i}$ is great or when the value of $1/v=(\mathrm{sqrt}(L_1\wedge2+L_2\wedge2))/L_3$ is great, $\cos(\psi_i)$ can significantly deviate with respect to the true value, as with the foregoing. Accordingly, it is considered that the positioning accuracy will be higher when only $c_{1i}$ is used than when $c_{1i}$ and $c_{2i}$ are used in combination.

It is considered when the value of $L_1/L_2$ is great and the value of $(\mathrm{sqrt}(L_1\wedge2+L_2\wedge2))/L_3$ is great, the positioning accuracy is increased by the combined use of $c_{1i}$ and $c_{2i}$. This is because when only $c_{1i}$ is used, the amount of information used for positioning decreases from 2N to N by half Auld the influence of the deviation contained in $c_{1i}$ on the estimated position of the terminal becomes large.

Therefore, according to the present embodiment, an error associated with three-dimensional positioning of a terminal can be reduced by performing the three-dimensional positioning of the terminal using $c_{1i}$ and $c_{2i}$ in combination as appropriate. Additionally, by flexibly changing the value of a parameter in accordance with the shape of the three-dimensional space in which the three-dimensional positioning is being performed, three-dimensional positioning of a terminal can be performed with relatively high accuracy in any three-dimensional space.

Other Configurations

<Modification 1>

The positioning apparatus 100 may not include the parameter changing unit 170. In the present modification, the position aggregation unit 160 uses a given parameter value and the positioning apparatus 100 skips step S16. The parameter value used by the position aggregation unit 160 may be a value that is defined as appropriate in accordance with the shape of the area in which the terminal is located and the result of a preliminary simulation.

<Modification 2>

Figure 13:
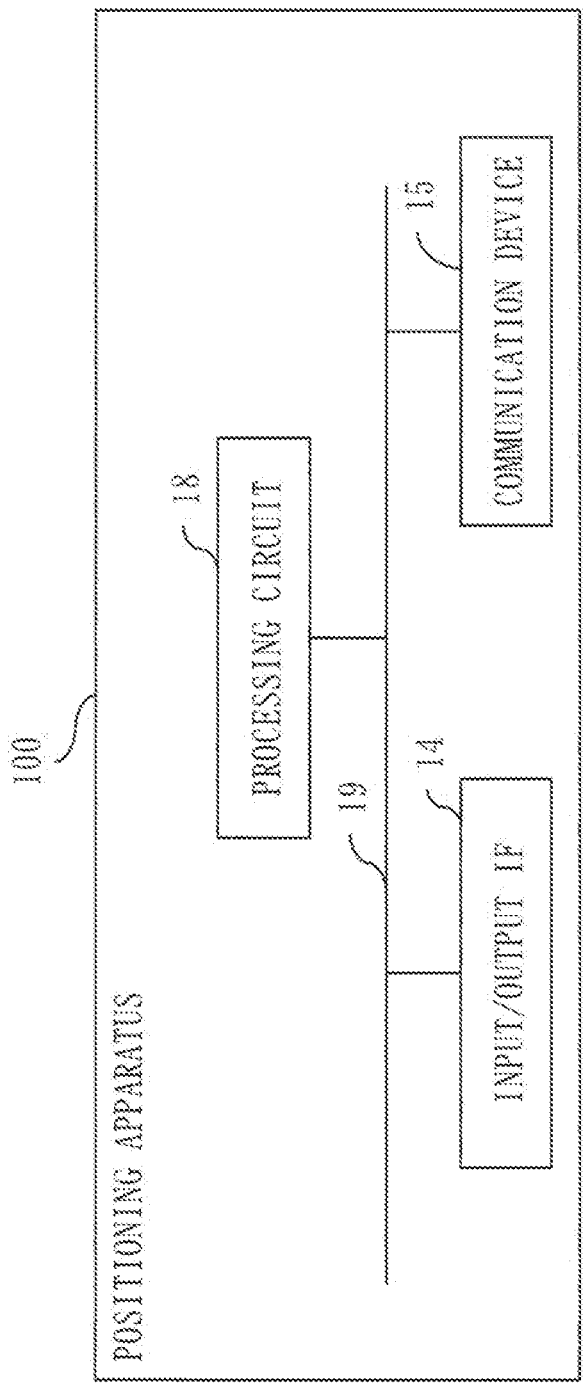
FIG. 13 shows an example of hardware configuration of the positioning apparatus 100 according to a modification of Embodiment 1.

FIG. 13 shows an example of hardware configuration of the positioning apparatus 100 according to the present modification.

The positioning apparatus 100 includes a processing circuit 18 in place of the processor 11, the processor 11 and the memory 12, the processor 11 and the secondary storage device 13, or the processor 11 and the memory 12 and the secondary storage device 13.

The processing circuit 18 is hardware that implements at least some of the components included in the positioning apparatus 100.

The processing circuit 18 may be dedicated hardware and ma be a processor to execute programs stored in the memory 12.

When the processing circuit 18 is dedicated hardware, the processing circuit 18 is a single circuit, a composite circuit, a programmed processor, a parallel-programmed processor, an ASIC (Application Specific Integrated Circuit), an FPGA (Field Programmable Gate Array), or a combination thereof, as specific examples.

The positioning apparatus 100 may include multiple processing circuits to replace the processing circuit 18. The multiple processing circuits share the role of the processing circuit 18.

In the positioning apparatus 100, some of the functions may be implemented by dedicated hardware and the remaining functions may be implemented by software or firm ware.

The processing circuit 18 is implemented by hardware, software, firmware, or a combination thereof, as specific examples.

The processor 11, the memory 12, the secondary storage device 13, and the processing circuit 18 are collectively called "processing circuitry". That is, the functions of the functional components of the positioning apparatus 100 are implemented by the processing circuitry.

Positioning apparatuses 100 according to other embodiments may have similar configurations to the present modification.

Embodiment 2

Differences from the embodiment described above are primarily described below with reference to drawings.

\*\*\*Description of Configuration\*\*\*

Figure 14:
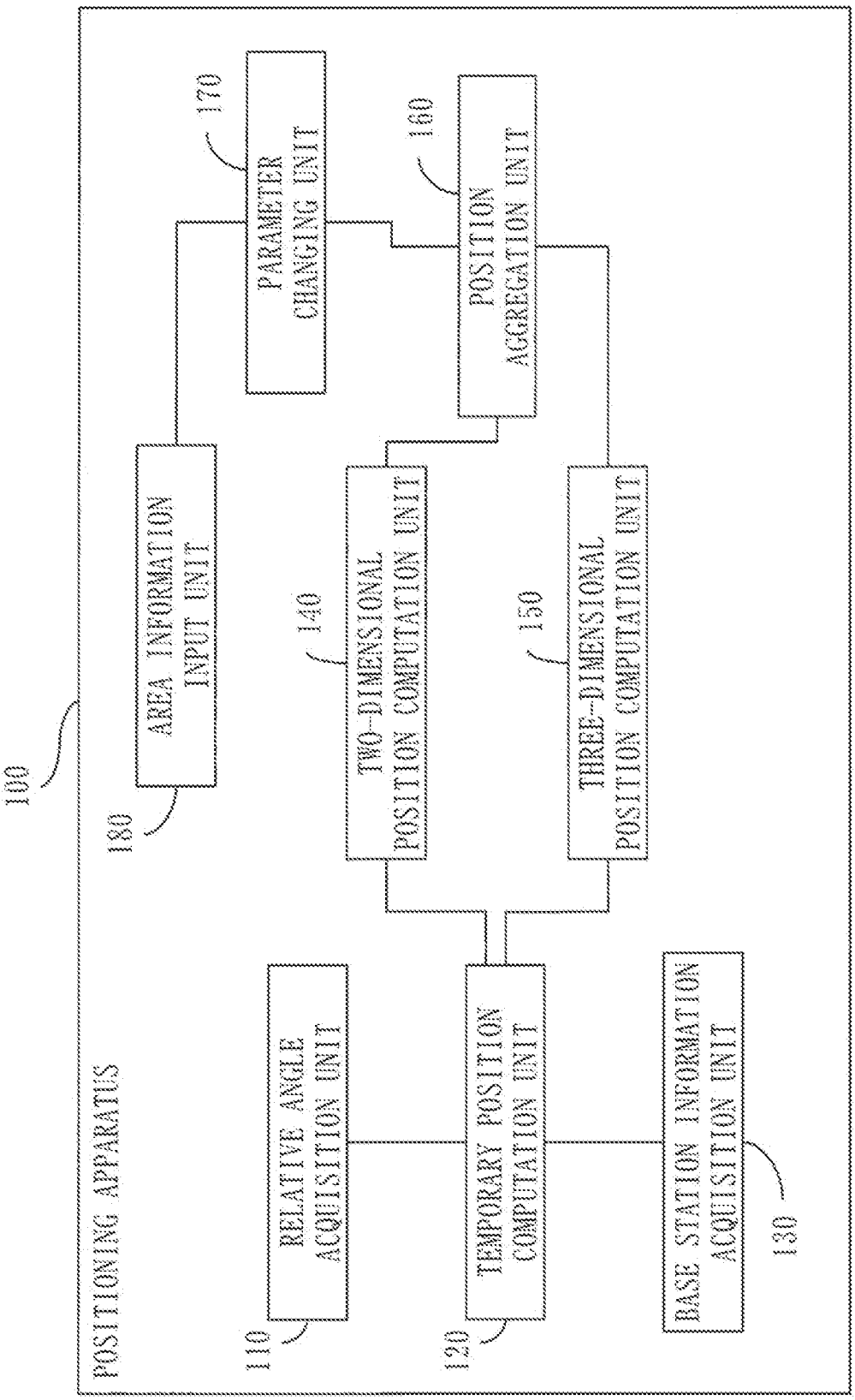
FIG. 14 shows a configuration example of the positioning apparatus 100 according to Embodiment 2.

FIG. 14 shows a configuration example of the positioning apparatus 100 according to the present embodiment. A difference of the positioning apparatus 100 according to the present embodiment from the positioning apparatus 100 according to Embodiment 1 is that it includes an area information input unit 180.

The area information input unit 180 receives information on the area in which the terminal and multiple base stations are located. As a specific example, the area information input unit 180 receives information showing the lengths of the sides showing each of the length of the target area in the longer direction, the length of the target area in the shorter direction, and the height of the target area.

The parameter changing unit 170 sets a parameter value using the information received by the area information input unit 180.

*Description of Operation*

Figure 15:
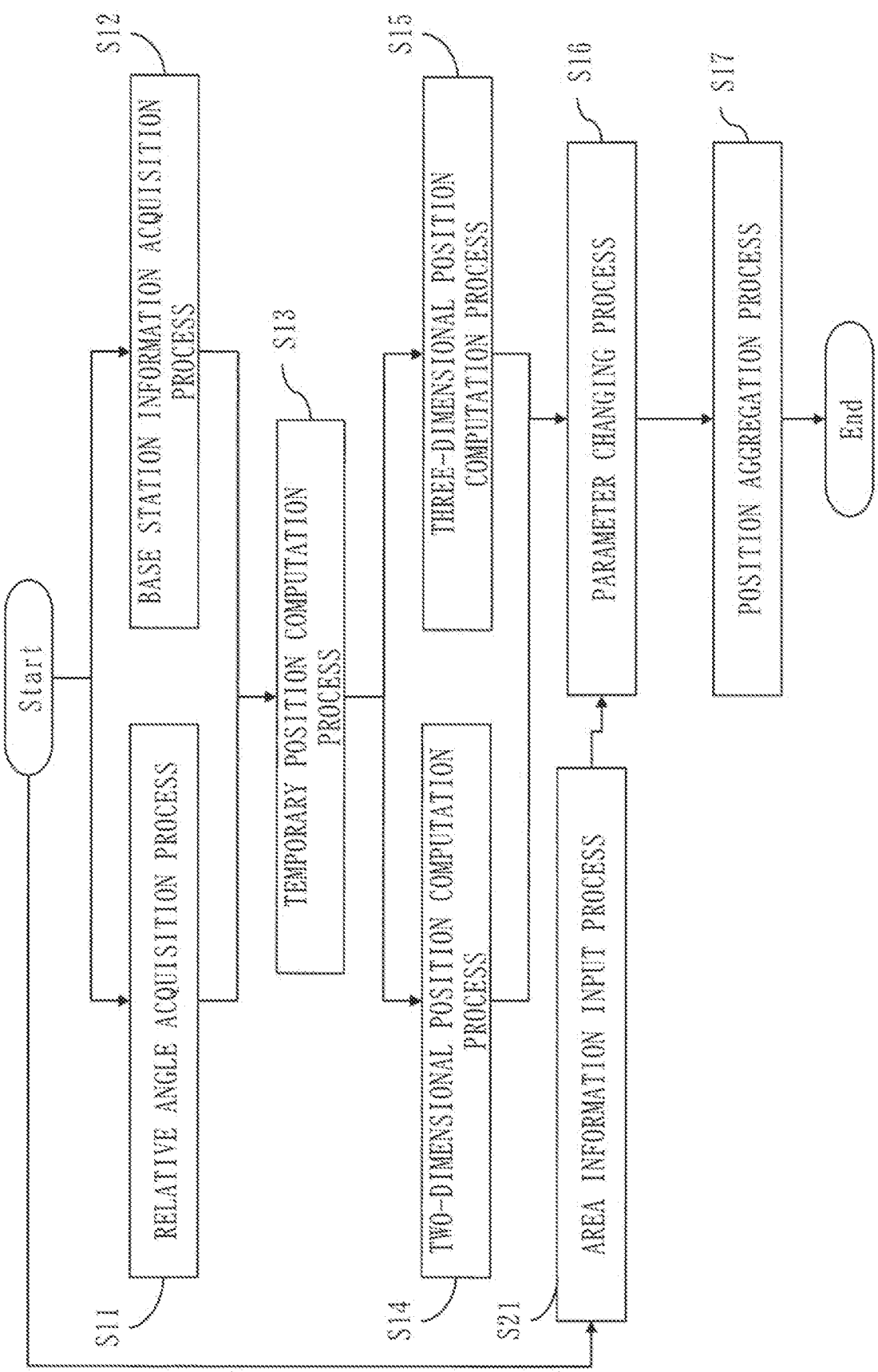
FIG. 15 is a flowchart illustrating operation of the positioning apparatus 100 according to Embodiment 2.

FIG. 15 is a flowchart illustrating an example of the operation of the positioning apparatus 100. Referring to this drawing, differences from the operation of the positioning apparatus 100 according to Embodiment 1 are primarily described.

(Step S21)

The area information input unit 180 receives information showing the lengths of the sides shown in FIG. 11, and sends the received information to the parameter changing unit 170.

(Step S16)

This step is essentially the same as step S16 according to Embodiment 1. However, the parameter changing unit 170 uses the information received from the area information input unit 180.

Description of the Effects of Embodiment 2

As described above, according to the present embodiment, information on the area in which the terminal and multiple base stations are located can be configured appropriately.

Embodiment 3

Differences from the embodiment described above are primarily described below with reference to drawings.

*Description of Configuration*

Figure 16:
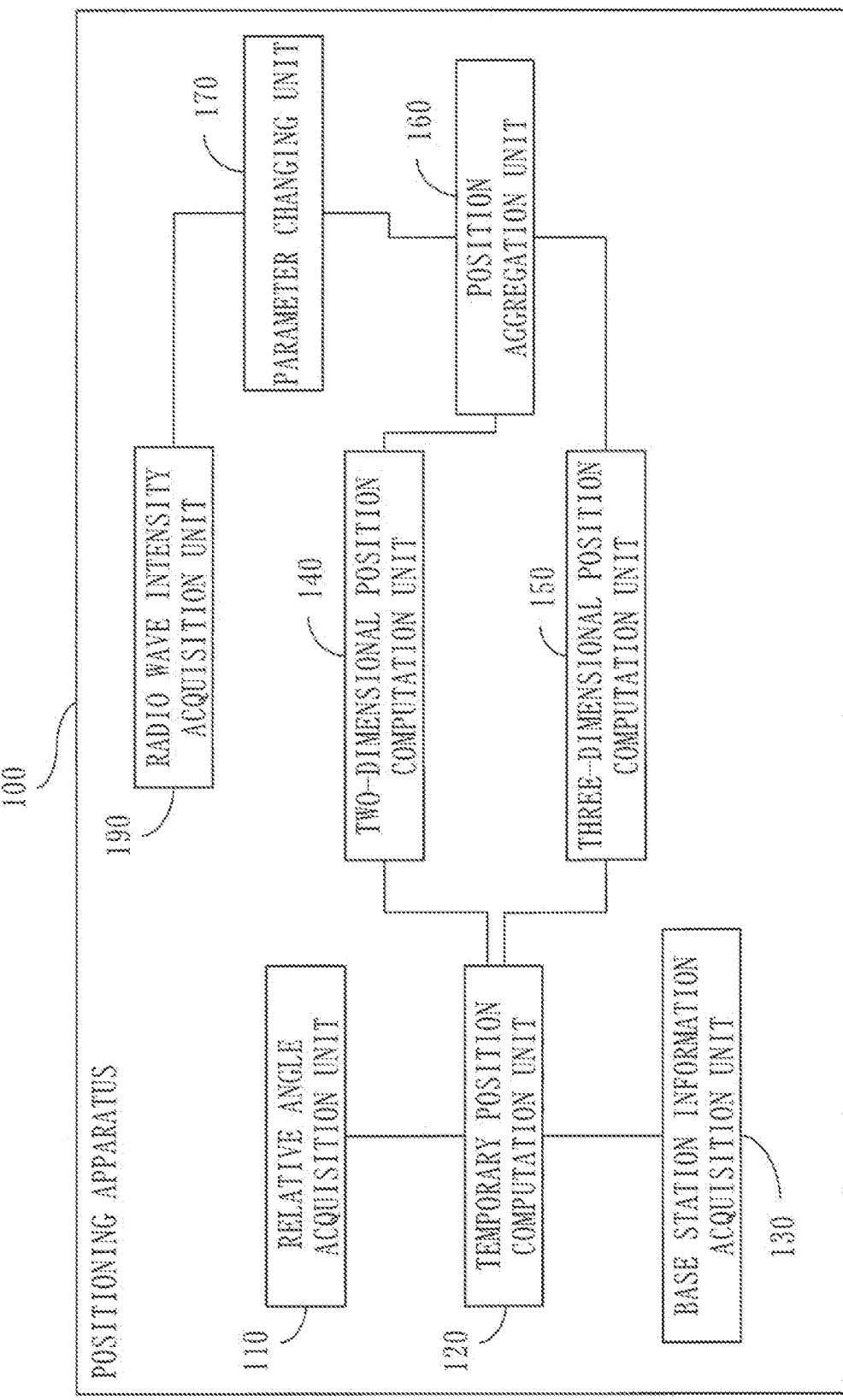
FIG. 16 shows a configuration example of the positioning apparatus 100 according to Embodiment 3.

FIG. 16 shows a configuration example of the positioning apparatus 100 according to the present embodiment. A difference of the positioning apparatus 100 according to the present embodiment from the positioning apparatus 100 according to Embodiment 1 is that it includes a radio wave intensity acquisition unit 190.

The radio wave intensity acquisition unit 190 acquires information showing a radio wave intensity corresponding to each base station and sends the acquired information to the parameter changing unit 170.

The parameter changing unit 170 sets a parameter value using the information acquired by the radio wave intensity acquisition unit 190.

*Description of Operation*

Figure 17:
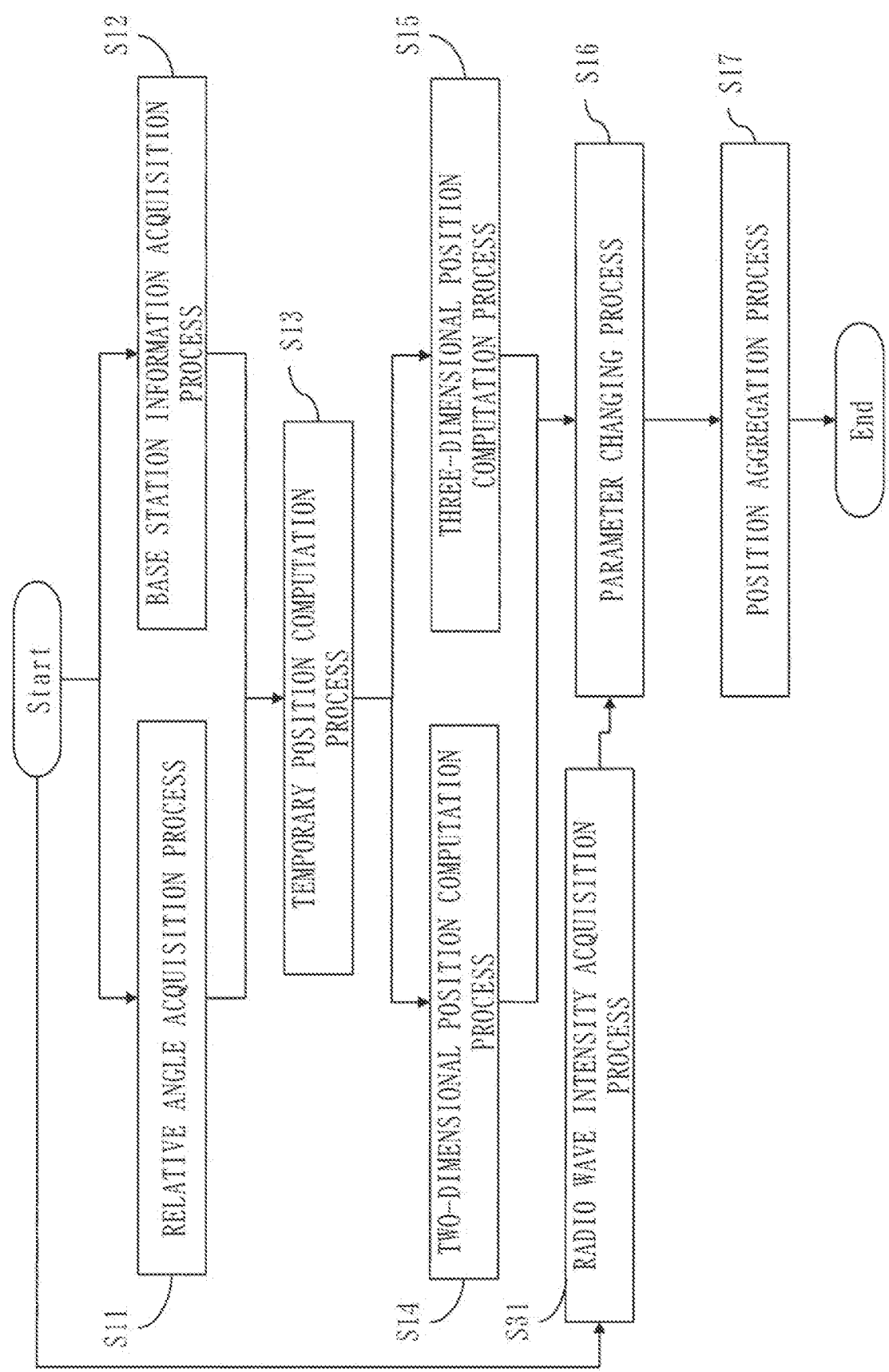
FIG. 17 is a flowchart illustrating operation of the positioning apparatus 100 according to Embodiment 3.

FIG. 17 is a flowchart illustrating an example of the operation of the positioning apparatus 100. Referring to this drawing, differences from the operation of the positioning apparatus 100 according to Embodiment 1 are primarily described.

(Step S31)

The radio wave intensity acquisition unit 190 acquires information showing the radio wave intensity corresponding to each base station and sends the acquired information to the parameter changing unit 170.

(Step S16)

The parameter changing unit 170 defines an area that contains the temporary position of the terminal and base stations that correspond to radio wave intensities equal to or higher than an intensity reference value, and changes the value of a parameter in accordance with the lengths of the sides of the defined area. In the present embodiment, the target area is a space that contains the terminal and base stations with a radio wave intensity with respect to the terminal being equal to or higher than the intensity reference value among the multiple base stations. The intensity reference value may be defined in any manner.

Description of the Effects of Embodiment 3

As described above, according to the present embodiment, an appropriate area can be set in accordance with the radio wave intensity corresponding to each base station.

Other Embodiments

Any combination of the embodiments described above, modification to a certain component of the embodiments, or omission of a certain component in the embodiments is possible.

Also, the embodiments are not limited to those shown in Embodiments 1 to 3 and various modifications may be made as necessary. Procedures described with flowcharts or the like may be modified as appropriate.

REFERENCE SIGNS LIST

11: processor: 12: memory; 13: secondary storage device; 14: input/output IF; 15: communication device; 18: processing circuit; 19: signal line: 90: positioning system; 100: positioning apparatus; 110: relative angle acquisition unit; 120: temporary position computation unit; 130: base station information acquisition unit; 140: two-dimensional position computation unit; 150: three-dimensional position computation unit; 160: position aggregation unit; 170: parameter changing unit; 180: area information input unit; 190: radio wave intensity acquisition unit.

The invention claimed is:

1. A positioning apparatus comprising:
processing circuitry, the processing circuitry configured:
to, using a plurality of two-dimensional direction vectors and a plurality of three-dimensional direction vectors, determine a temporary position of a terminal communicating with each of a plurality of base stations in a three-dimensional space, wherein the plurality of two-dimensional direction vectors are vectors that are each computed using each of a plurality of observed angles which has been observed as an angle formed by a position of each of the plurality of base stations and the terminal, said vectors being based on an angle for a two-dimensional direction of the plurality of observed angles, and the plurality of three-dimensional direction vectors are vectors that are each computed using each of the plurality of observed angles and are based on an angle for a three-dimensional direction of the plurality of observed angles;
to determine a two-dimensional position of the terminal using a two-dimensional component of the position of each of the plurality of base stations, the plurality of two-dimensional direction vectors, and a plurality of two-dimensional weights, wherein the plurality of two-dimensional weights are each a weight corresponding to the two-dimensional component of the position of each of the plurality of base stations and determined based on the two-dimensional component of the position of each of the plurality of base stations and on a two-dimensional component of the temporary position;

to determine a three-dimensional position of the terminal using a three-dimensional component of the position of each of the plurality of base stations, the plurality of three-dimensional direction vectors, and a plurality of three-dimensional weights, wherein the plurality of three-dimensional weights are each a weight corresponding to the three-dimensional component of the position of each of the plurality of base stations and determined based on the three-dimensional component of the position of each of the plurality of base stations and on a three-dimensional component of the temporary position; and to determine a weighted mean of the two-dimensional position and a two-dimensional component of the three-dimensional position as a two-dimensional component of a position of the terminal, and to adopt a third-dimension component of the three-dimensional position as a third-dimension component of the position of the terminal.

2. The positioning apparatus according to claim 1, wherein each of the plurality of two-dimensional weights is a value that is dependent on an inverse of a distance formed between the two-dimensional component of the position of each of the plurality of base stations and the two-dimensional component of the temporary position, and each of the plurality of three-dimensional weights is a value that is dependent on an inverse of a distance formed between the three-dimensional component of the position of each of the plurality of base stations and the three-dimensional component of the temporary position.

3. The positioning apparatus according to claim 1, wherein the processing circuitry changes a value of a weighted mean parameter to a value that is dependent on a shape of a target area, the weighted mean parameter being a parameter used with the weighted mean.

4. The positioning apparatus according to claim 3, wherein the processing circuitry changes the value of the weighted mean parameter in accordance with a ratio of a length of the target area in a shorter direction to a length of the target area in a longer direction and a ratio between a diagonal length of the target area in two dimensions and a height of the target area.

5. The positioning apparatus according to claim 3, wherein the processing circuitry changes the value of the weighted mean parameter with reference to a lookup table that shows values of the weighted mean parameter on a condition by condition basis.

6. The positioning apparatus according to claim 3, wherein the target area is an area defined based on the temporary position.

7. The positioning apparatus according to claim 3, wherein the processing circuitry receives information showing each of a length of the target area in a longer direction, a length of the target area in a shorter direction, and a height of the target area.

8. The positioning apparatus according to claim 3, wherein the target area is a space that contains the terminal and base stations with a radio wave intensity with respect to the terminal being equal to or higher than an intensity reference value among the plurality of base stations.

9. A positioning method comprising:

by using a plurality of two-dimensional direction vectors and a plurality of three-dimensional direction vectors, determining, by a computer, a temporary position of a terminal communicating with each of a plurality of base stations in a three-dimensional space, wherein the plurality of two-dimensional direction vectors are vectors that are each computed using each of a plurality of observed angles which has been observed as an angle formed by a position of each of the plurality of base stations and the terminal, said vectors being based on an angle for a two-dimensional direction of the plurality of observed angles, and the plurality of three-dimensional direction vectors are vectors that are each computed using each of the plurality of observed angles and are based on an angle for a three-dimensional direction of the plurality of observed angles;

determining, by the computer, a two-dimensional position of the terminal using a two-dimensional component of the position of each of the plurality of base stations, the plurality of two-dimensional direction vectors, and a plurality of two-dimensional weights, wherein the plurality of two-dimensional weights are each a weight corresponding to the two-dimensional component of the position of each of the plurality of base stations and determined based on the two-dimensional component of the position of each of the plurality of base stations and on a two-dimensional component of the temporary position;

determining, by the computer, a three-dimensional position of the terminal using a three-dimensional component of the position of each of the plurality of base stations, the plurality of three-dimensional direction vectors, and a plurality of three-dimensional weights, wherein the plurality of three-dimensional weights are each a weight corresponding to the three-dimensional component of the position of each of the plurality of base stations and determined based on the three-dimensional component of the position of each of the plurality of base stations and on a three-dimensional component of the temporary position; and determining, by the computer, a weighted mean of the two-dimensional position and a two-dimensional component of the three-dimensional position as a two-dimensional component of a position of the terminal, and adopting a third-dimension component of the three-dimensional position as a third-dimension component of the position of the terminal.

10. A non-transitory computer readable medium storing a positioning program that causes a positioning apparatus as a computer to execute:

a temporary position computation process to, using a plurality of two-dimensional direction vectors and a plurality of three-dimensional direction vectors, determine a temporary position of a terminal communicating with each of a plurality of base stations in a three-dimensional space, wherein the plurality of two-dimensional direction vectors are vectors that are each computed using each of a plurality of observed angles which has been observed as an angle formed by a position of each of the plurality of base stations and the terminal, said vectors being based on an angle for a two-dimensional direction of the plurality of observed angles, and the plurality of three-dimensional direction vectors are vectors that are each computed using each of the plurality of observed angles and are based on an angle for a three-dimensional direction of the plurality of observed angles;

a two-dimensional position computation process to determine two-dimensional position of the terminal using a two-dimensional component of the position of each of the plurality of base stations, the plurality of two-dimensional direction vectors, and a plurality of two-dimensional weights, wherein the plurality of two-dimensional weights are each a weight corresponding to the two-dimensional component of the position of each of the plurality of base stations and determined based on the two-dimensional component of the position of each of the plurality of base stations and on a two-dimensional component of the temporary position;

a three-dimensional position computation process to determine a three-dimensional position of the terminal using a three-dimensional component of the position of each of the plurality of base stations, the plurality of three-dimensional direction vectors, and a plurality of three-dimensional weights, wherein the plurality of three-dimensional weights are each a weight corresponding to the three-dimensional component of the position of each of the plurality of base stations and determined based on the three-dimensional component of the position of each of the plurality of base stations and on a three-dimensional component of the temporary position; and a position aggregation process to determine a weighted mean of the two-dimensional position and a two-dimensional component of the three-dimensional position as a two-dimensional component of a position of the terminal, and to adopt a third-dimension component of the three-dimensional position as a third-dimension component of the position of the terminal.

* * * * *